July 30, 1963 R. C. REILLY 3,099,366
LOADING TERMINAL METERING SYSTEM
Filed Oct. 19, 1961 2 Sheets-Sheet 1

INVENTOR.
R. C. REILLY
BY Young & Quigg
ATTORNEYS

United States Patent Office 3,099,366
Patented July 30, 1963

3,099,366
LOADING TERMINAL METERING SYSTEM
Robert C. Reilly, Bartlesville, Okla., assignor to Phillips Petroleum Company, a corporation of Delaware
Filed Oct. 19, 1961, Ser. No. 146,260
3 Claims. (Cl. 222—20)

This invention is a system for loading bulk liquids operated by customers and automatically metering the volume drawn by each. In one aspect it relates to method and apparatus at unattended loading terminals permitting customers to actuate the single loading and metering facilities by operating any one of a plurality of individual key switches.

In the refined petroleum products bulk terminals, there is increasing use of automatic, around the clock, equipment for loading of customers' transport vehicles. Generally, a single measuring unit, such as a known volume meter tank or a positive displacement meter, employing mechanical registers which can register the loadings of only a very limited number of customers per meter. Thus, a large number of customers would require many meters for each product.

It is, therefore, an object of this invention to provide apparatus for automatically loading and metering liquid products to a large number of customers from a single meter or measuring device source.

It is another object of this invention to provide improved loading terminal metering including automatic recording of the volumes loaded by a plurality of customers.

It is still another object to provide a plurality of individual key switches, any one of which can actuate a single loading and metering facility while separately recording volumes withdrawn by a given customer.

Other aspects, objects, modifications, and alternations of this invention will become apparent to those skilled in the art without departing from the scope and spirit of this invention and it should be understood that the latter is not necessarily limited to the aforementioned discussion.

According to a specific embodiment of my invention there is provided a method for actuating by any one of a plurality of key switches, electrical circuits essential to the operation of the loading pump, and circuits to special magnetic counters registering the volume of liquid metered by the use of single positive displacement meter, transmitting an electrical pulse for each revolution of the shaft of the positive displacement meter, automatically recording the transmitted pulses on magnetic counters one of which is coupled to the particular key switch previously closed.

Figure 1:
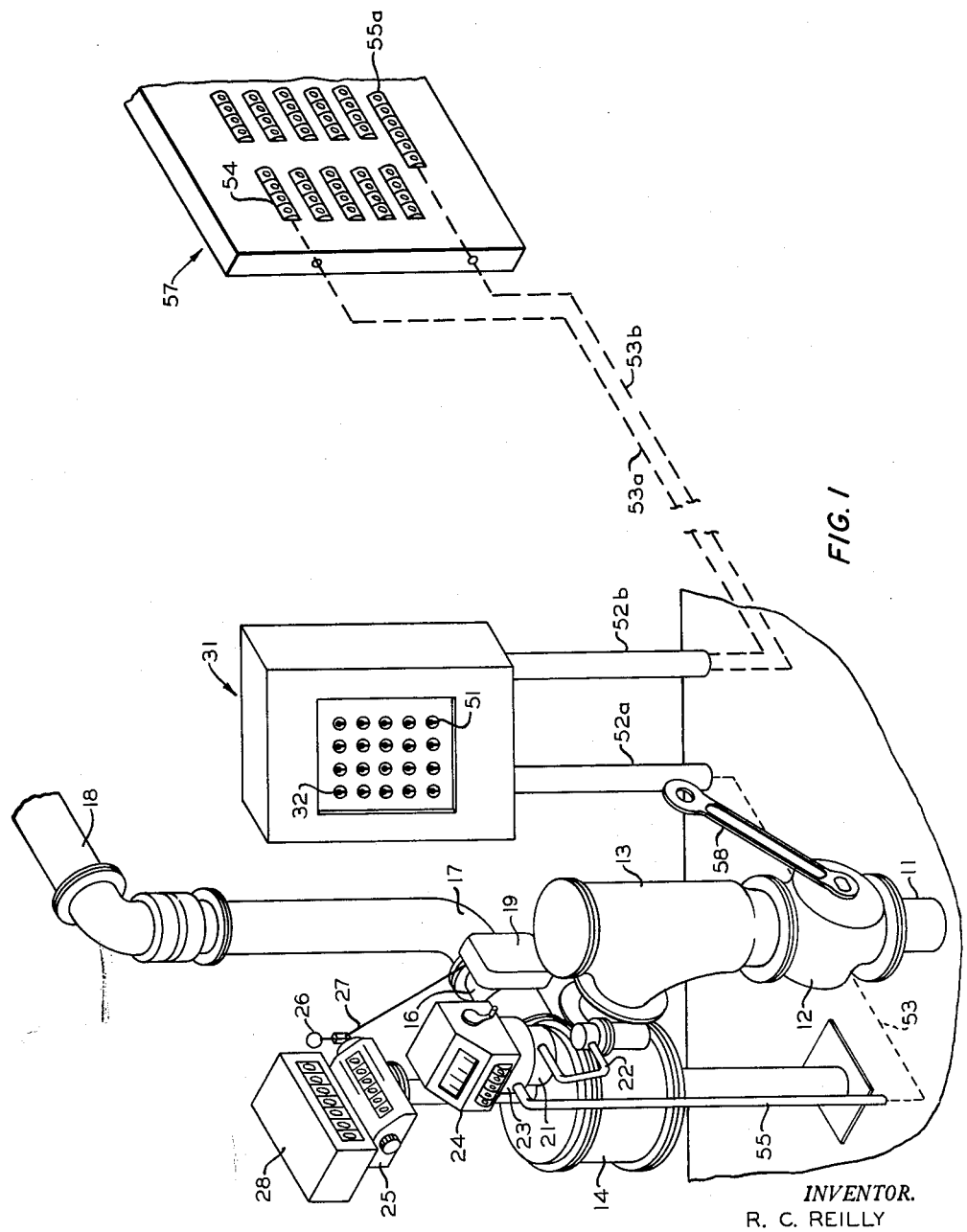
Figure 2:
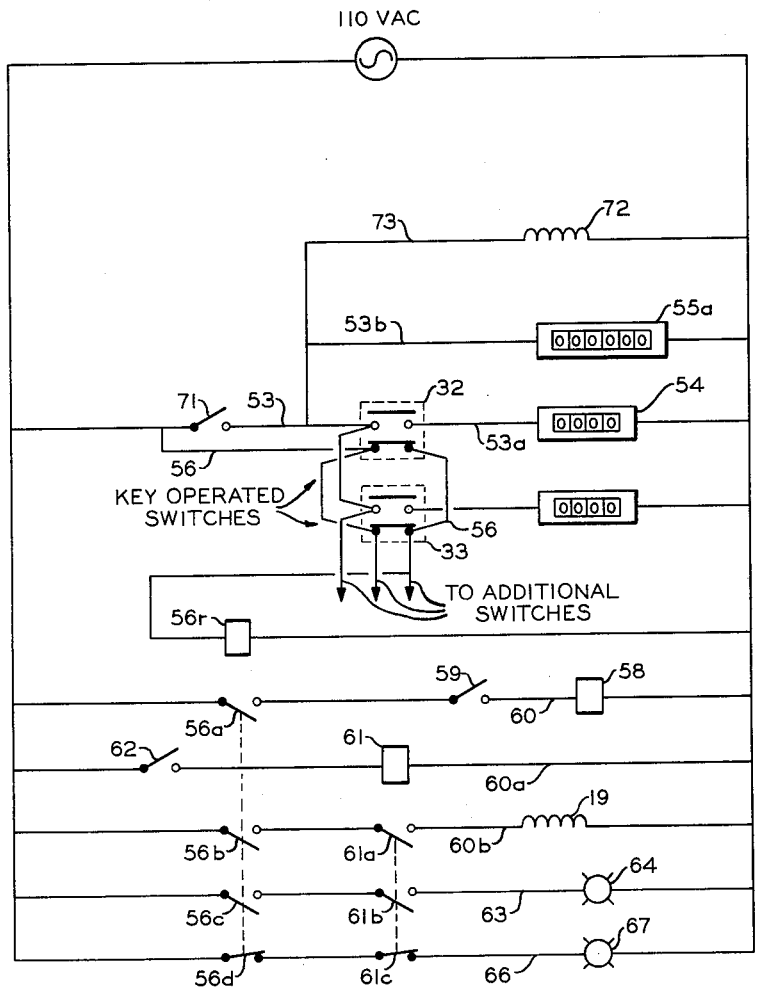

In the drawing, wherein like parts have been designated with like reference numerals, FIGURE 1 is a typical view of the arrangement of liquid loading line valves, registers, liquid meter, key switches, and remote individual electric pulse counters; and FIGURE 2 is a schematic of the circuitry controlling operation of a typical key-stop loading terminal.

Referring now to FIGURE 1, conduit 11 from a product storage tank (not shown) connects with meter inlet valve 12. Adjacent valve 12 is an angle type strainer 13. Strainer 13 makes a flanged connection with meter 14, of the positive displacement type, such as A. O. Smith Meter AS-50, described in Smith Meter Products Parts List 4-S/b.

Adjacent the outlet of meter 14, is a set-stop valve 16, which permits flow from the meter into conduit 17 of loading arm assembly 18. A suitable valve is Smith-Erie 4" Set-Stop Valve Model No. 511927-1, described in A. O. Smith Meter Products Parts List No. 2-T/b.

Operatively connected to set-stop valve 16 is a solenoid clutch 19, which must be energized to permit opening of the valve, as to be described subsequently.

Adapter 21 provides two heads, enabling meter 14 to accommodate both net and gross gallonage registers. Adapter 21 also has an integral automatic temperature compensator, communicating via conduit 22 with the meter inlet flange. A magnetic pulse transmitter 23, operatively connected to adapter 21 and to the shaft (not shown) of meter 14, transmits a pulse representative of some portion of or a multiple of a revolution of said shaft. The Type "C" transmitter described in A. O. Smith Corp. Bulletin 185, dated October 1959, is suitable for this purpose. A net gallonage register and delivery ticket printer 24 is mechanically linked to meter 14. A suitable register is No. 3314, described in A. O. Smith Bulletin 1266, dated July 1957.

A set-stop counter 25 is mechanically linked to set-stop valve 16, so that when set-stop handle 26 is pulled down, the set-stop valve is opened, by the set-stop linkage 27. A suitable type of Set-Stop Counter is Smith-Erie Model No. 452, described in the A. O. Smith Meter Products List No. 5–M. This also starts a loading pump (not shown) located upstream in conduit 11. A suitable linkage is described in the A. O. Smith Meter Products Parts List No. 2–S/c. Operatively connected to set-stop counter 25 is a register 28 for indicating the gross gallons delivered through meter 14. A suitable type register is No. 3301 described in A. O. Smith Bulletin 1266, dated July 1957.

Panel 31 comprises the loading control component, shown with twenty key switches, 32 to 51, in this particular installation. This allows any of 20 individual customers to operate the product loading equipment in a safe and unsupervised manner. A suitable type is the Smith-Erie Electric Key Switch (Explosion Proof), Assembly 505922–1, described in A. O. Smith Meter Products Parts List No. SD-127.

Lead 53 passes from pulse transmitter 23, within conduits 55 and 52a, to panel 31. Within the panel, the lead is tapped, one side, 53a, going through key switch 32, to individual pulse counter 54, and the other side, 53b, passing directly to master pulse counter 55a. Both leads 53a and b pass through protective conduit 52b.

A Veeder Root Reset Magnetic Counter, cat. page G59–79 is suitable for this use. Such individual counters may preferably be mounted on a panel board 57 located in the bulk terminal office, for the use of terminal personnel only. Wrench 58 on inlet valve 12 is provided for shutting off product flow through the meter for maintenance, safety, etc.

Necessary leads (not shown) from a relay (not shown), common to all the individual key switches pass from panel 31 via conduit 52a, to actuate several components (not shown), namely, the additive pump clutch solenoid, a relay in the input power circuit to the liquid loading pump, and to warning light circuits. Another lead passes from panel 31 via conduit 52a to solenoid clutch control 19 on set-stop valve 16.

In FIGURE 2 is shown a schematic of the circuitry for a multi-key loading terminal. Only two key operated switches are shown for the sake of clarity, although it is indicated how a large number of such switches can be connected in parallel to actuate the system, as will be described. The system is powered by a 110 volt, A.C. power source.

Double pole key switch 32 is disposed in lead 53a which connects with individual pulse counter 54. The other lead 56 of switch 32 connects to relay 56r. As the contact 56a of energized relay 56r is closed, loading pump control 58 is ready to be started, provided switch 59 in circuit 60 is manually tripped closed by the pulling down of the set-stop handle 26 of FIGURE 1. As contact 56b of energized relay 56r is simultaneously closed, the clutch solenoid 19 in circuit 60b of set-stop valve 16 of FIGURE 1 is energized, provided the truck is properly grounded. This will be indicated by the closed position of contact 61a on energized ground relay 61. Ground relay 61 is, in turn, energized by the closing of a contact 62. Contact 62 is closed through the circuitry of a ground detector, such as an Anderson Safety Ohm MG–5 ground detector, when the truck is properly grounded.

Specifically, a ground cable in the terminal is permanently connected to the ground detector at one end and to special fitting on the truck at other end. Connecting of the cable to the truck, completes a circuit within the ground detector. This energizes a relay within the same which relay closes contact 62 in the ground relay circuit 60a.

When contacts 56c and 61b of relays 56r and 61, respectively, are closed, this completes circuit 63, turning on red light 64. Simultaneously, contacts 56d and 61c, also on relays 56r and 61 respectively, are opened, breaking circuit 66, thus turning off green light 67.

When meter 14 is operating, the shaft of transmitter 23, which is geared to the shaft of the meter 14, cyclically closes contact 71. The closing of contact 71 pulses additive pump clutch solenoid 72 disposed in lead 73, also pulses master pulse counter 55a, in lead 53b, as well as pulsing the individual counter 54 of that customer, in lead 53a through switch 32.

In operation, a customer enters the unattended loading terminal through a common key-operated motor-driven gate. The driver positions his truck in the loading dock area and connects a ground cable to this truck. Next, a delivery ticket is stamped "in" at the master register printer 24, and the desired gallonage is manually set on set-stop counter 25. An individual key is then inserted into the assigned individual key switch, 32 for example, on the particular panel for the product desired to be loaded, which results in the following sequence of operation regarding the interlocking circuitry of FIGURE 2.

The turning of the individual key closes double-pole switch 32, one pole completing the circuit 53a to the customer's individual pulse counter 54 on remote panel 57 of FIGURE 1. Simultaneously, the other pole closes second circuit 56, energizing relay 56r. The closing of relay 56r energizes the solenoid clutch 19 on set-stop valve 16. If this solenoid clutch is not first energized, the set-stop handle 26 will not open the set-stop valve via linkage 27, but the handle will merely swing "free," thereby preventing gravity loading, which avoids non-recording of the product loaded by a customer.

With contacts 56c and 61b now closed, this completes the red light circuit 63, turning on red light 64. Concomitantly, contacts 56d and 61c are open, breaking the green light circuit 66, and turning off green light 67. Further, the closing of relay 56r has made "ready" loading pump control circuit 60. Finally, the driver then pulls down handle 26, which opens the set-stop valve, and through switch 59 of circuit 60 being closed by the set-stop linkage 27, this starts the product loading pump by means of control 58.

As flow proceeds through meter 14, transmitter 23 emits a pulse representative of some portion of each rotation of the meter shaft, for example, one pulse for each ten gallons loaded. This ratio is dependent upon gear train selected. This pulse is registered on master pulse counter 55a and through closed switch 32 on individual counter 54. Transmitter 23 also pulses the additive pump clutch solenoid 72, for injecting the proper amount of additive into the loading liquid.

When the gallonage manually preset on counter 25 has been metered through the loading conduit 17, the set-stop linkage will automatically close set-stop valve 16, and open switch 59, stopping the loading pump control 58.

The driver will then stamp "out" his meter ticket on register-printer 24; disconnect the ground cable, opening relay 61, thereby closing contact 61c; remove his key from switch 32, deenergizing relay 56r, thereby closing contact 56d. If he has performed all of the just recited steps, he will note that green light 67 is on, and he may move his truck from the loading dock. If he failed either to remove the grounding cable from the truck, or to take his key from the switch, he will not see the green light burning, but the red light will remain on. This alerts him that he has not followed the correct shut down procedure preparatory to driving out.

The operation of the red and green lights not only serve as a guide to the correct loading procedure, but also serve as a "trouble-shooter." For example, if the driver thinks he has followed all the steps necessary to start pumping, but the red light did not come "on," he would know to check his truck grounding cable connection, or make sure his key was in the correct position.

The obvious advantage of the present system lies in dispensing with the presence of a facility operator while drivers are loading their trucks. It further provides a fool-proof check on each customer, in addition to the meter ticket that is customarily stamped "in" and "out" for each load received, in the following manner.

The facility operator during his normal work hours can check the transactions which occurred during the previous loading period by comparing the total gallons loaded on either the master pulse counter or the register-printer with the total of the gallons stamped on the deposited meter tickets. If the totals do not agree, the operator knows that a customer forgot to leave a meter ticket, the ticket is lost, or someone helped himself to a load without stamping an identifying ticket.

With the individual counters of the present system, the operator checks each customers individual counter total against the available meter tickets for that particular customer, and quickly determines which customer made the error. Thus, each customer can rest assured on the proper metering charge. He still needs concern himself primarily with the caliber of the drivers. However, dishonest personnel will be quickly discovered the first time they load a truck without leaving a customer-identifying stamped meter ticket. Of course, the safety of such an unattended operation will depend on the good judgment of the driver.

Various modifications and alterations of this invention will become apparent to those skilled in the art without departing from the scope and spirit of this invention and it should be understood that the latter is not necessarily limited to the aforementioned discussion.

I claim:

1. In a liquid loading terminal, apparatus for loading and registering the volume of liquid pumped therefrom, and separately registering the volume drawn by a particular recipient, comprising: an inlet conduit for said liquid; a meter connected to said inlet conduit; a set-stop valve connected to the outlet end of said meter; an outlet conduit communicating between said valve and a tank loading assembly; a solenoid clutch operatively connected to said set-stop valve a truck grounding circuit incorporating said clutch adapted to energize the latter when said circuit is in the closed position; an electric pulse transmitter operatively connected to the shaft of said meter to transmit a pulse representative of some portion of a revolution of the shaft of said meter; a plurality of electrical pulse counters adapted to receive said pulses; an automatic temperature compensator connected to said inlet conduit, which adjusts the frequency of pulse from said pulse transmitter to compensate for unit volume changes of said liquid due to ambient temperature variations; a gross liquid volume register operatively connected to said meter; a set-stop counter operatively connected to said set-stop valve; mechanical means to control the operation of said set-stop valve; a register operatively connected to said set-stop counter for indicating the unit liquid volume delivered; power control means having a plurality of individual key switches electrically paired with said pulse counters for actuating the loading apparatus; each of said key switches further comprising a double-pole switch disposed in a pair of electrical circuits, the first of said circuits having a single relay disposed therein controlling the power input to a liquid loading pump and the operation of said set-stop valve said first relay being common to every pair of said electrical circuits, and second of said circuits controlling the transmission of the pulses emitted by said transmitter to the pulse counter corresponding to the particular key switch which activates the liquid loading apparatus; and a master pulse counter connected directly to said pulse transmitter and adapted to receive and totalize all of the pulses emitted thereby.

2. In a bulk liquid loading terminal, apparatus for loading and registering the volume of liquid pumped therefrom, and separately registering the volume drawn by a particular recipient, comprising: an inlet conduit for said bulk liquid; a positive displacement meter connected to said inlet conduit; a set-stop valve connected to the outlet end of said meter; an outlet conduit communicating between said valve and a tank loading assembly; a solenoid clutch operatively connected to said set-stop valve a truck grounding circuit incorporating said clutch adapted to energize the latter when said circuit is in the closed position; an electric pulse transmitter operatively connected to the shaft of said meter to transmit a pulse representative of some portion of a revolution of said meter shaft; a plurality of electrical pulse counters adapted to receive said pulses; an automatic temperature compensator connected to said inlet conduit for adjusting the frequency of pulses from said pulse transmitter to compensate for unit volume changes of said liquid due to ambient temperature variations; a gross liquid volume register and delivery ticket printer operatively connected to said meter; a set-stop counter operatively connected to said set-stop valve; lever means to control the operation of said set-stop valve; a register operatively connected to said set-stop counter for indicating the unit liquid volume delivered; control panel and acompanying circuitry having a plurality of individual key switches electrically paired with said pulse counters for actuating the loading apparatus; each of said key switches further comprising a double-pole switch disposed in a pair of electrical circuits, the first of said circuits having a single relay disposed therein controlling the power input to a liquid loading pump and the operation of said set-stop valve said first relay being common to every pair of said electrical circuits, and the second of said circuits controlling the transmission of the pulses emitted by said transmitter to the pulse counter corresponding to the particular key switch which activates the loading apparatus; and a master pulse counter connected directly to said pulse transmitter and adapted to receive and totalize all of the pulses emitted thereby.

3. In a liquid loading terminal, apparatus for loading and registering the volume of liquid pumped therefrom, and separately registering the volume drawn by a particular recipient, comprising: an inlet conduit for said liquid; a meter connected to said inlet conduit; a set-stop valve connected to the outlet end of said meter; an outlet conduit communicating between said valve and a tank loading assembly; a solenoid clutch operatively connected to said set-stop valve; a truck grounding circuit incorporating said clutch adapted to energize the latter when said circuit is in the closed position; an electric pulse transmitter operatively connected to the shaft of said meter to transmit a pulse representative of some portion of a revolution of the shaft of said meter; a plurality of electrical pulse counters adapted to receive said pulses; a gross liquid volume register operatively connected to said meter; a set-stop counter operatively connected to said set-stop valve; mechanical means to control the operation of said set-stop valve; a register operatively connected to said set-stop counter for indicating the unit liquid volume delivered; power control means having a plurality of individual key switches electrically paired with said pulse counters for actuating the loading apparatus; each of said key switches further comprising a double-pole switch disposed in a pair of electrical circuits, the first of said circuits having a single relay disposed therein controlling the power input to a liquid loading pump and the operation of said set-stop valve, said first relay being common to every pair of said electrical circuits, and second of said circuits controlling the transmission of the pulses emitted by said transmitter to the pulse counter corresponding to the particular key switch which activates the liquid loading apparatus; and a master pulse counter connected directly to said pulse transmitter and adapted to receive and totalize all of the pulses emitted thereby.

References Cited in the file of this patent

UNITED STATES PATENTS

| | | |
|---|---|---|
| 1,890,078 | Enocks et al. | Dec. 6, 1932 |
| 2,250,326 | Carroll | July 22, 1941 |
| 2,712,885 | Winship | July 12, 1955 |
| 2,884,793 | Billeter | May 5, 1959 |
| 2,995,275 | Brice | Aug. 8, 1961 |